United States Patent
Hino (10) Patent No.: US 12,304,550 B2
(45) Date of Patent: May 20, 2025

(54) DECORATIVE BODY

(71) Applicant: KABUSHIKI KAISHA TOKAI-RIKA-DENKI-SEISAKUSHO, Aichi-ken (JP)

(72) Inventor: Taichi Hino, Aichi (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 127 days.

(21) Appl. No.: 17/792,057

(22) PCT Filed: Dec. 15, 2020

(86) PCT No.: PCT/JP2020/046826
§ 371 (c)(1),
(2) Date: Jul. 11, 2022

(87) PCT Pub. No.: WO2021/145123
PCT Pub. Date: Jul. 22, 2021

(65) Prior Publication Data
US 2023/0119523 A1    Apr. 20, 2023

(30) Foreign Application Priority Data
Jan. 14, 2020  (JP) .................... 2020-003974

(51) Int. Cl.
*B62D 1/04*   (2006.01)
*B62D 1/06*   (2006.01)

(52) U.S. Cl.
CPC .............. *B62D 1/06* (2013.01); *B62D 1/046* (2013.01)

(58) Field of Classification Search
CPC . B62D 1/04; B62D 1/046; B62D 1/06; B62D 1/065
See application file for complete search history.

(56) References Cited

U.S. PATENT DOCUMENTS

| | | | |
|---|---|---|---|
| 8,783,132 B2 * | 7/2014 | Neumann | B60Q 3/283 74/552 |
| 9,159,221 B1 | 10/2015 | Stantchev | |
| 10,124,823 B2 * | 11/2018 | Van'tZelfde | B62D 1/065 |
| 10,173,713 B2 * | 1/2019 | Hino | B62D 1/06 |

(Continued)

FOREIGN PATENT DOCUMENTS

| | | | | |
|---|---|---|---|---|
| DE | 102012000572 A1 * | 7/2013 | | B60Q 5/003 |
| JP | S5955845 U | 4/1984 | | |

(Continued)

OTHER PUBLICATIONS

Machine translation of JP 2019-85025 A obtained on Apr. 16, 2024.*

(Continued)

*Primary Examiner* — Adam D Rogers
(74) *Attorney, Agent, or Firm* — Dority & Manning, P.A.

(57) ABSTRACT

In a steering wheel, a decorative member is assembled to a steering wheel main body. A sensor of the decorative member senses contact of a hand of a vehicle occupant with the decorative member. The sensor is arranged at the decorative member independently from a steering wheel main body side. Therefore, the sensor may sense contact of the hand with the decorative member independently from the steering wheel main body side.

9 Claims, 7 Drawing Sheets

(56) References Cited

U.S. PATENT DOCUMENTS

| | | | |
|---|---|---|---|
| 10,179,600 B2* | 1/2019 | Maekubo | B62D 1/06 |
| 10,370,019 B2* | 8/2019 | Michelmann | B62D 1/046 |
| 10,654,508 B2* | 5/2020 | Fuji | H05B 3/16 |
| 11,482,999 B2* | 10/2022 | Takahara | G01D 5/24 |
| 11,643,129 B2* | 5/2023 | Urushibata | G01D 5/2417 |
| | | | 324/661 |
| 11,654,952 B2* | 5/2023 | Hayashi | H05B 1/0236 |
| | | | 219/204 |
| 11,794,800 B2* | 10/2023 | Nozoe | G01V 3/088 |
| 11,820,429 B2* | 11/2023 | Kojima | B60K 35/00 |
| 11,912,331 B2* | 2/2024 | Nakano | B32B 27/304 |
| 2002/0017157 A1 | 2/2002 | Kreuzer et al. | |
| 2005/0269018 A1* | 12/2005 | Haart | B62D 1/06 |
| | | | 156/196 |
| 2010/0218641 A1 | 9/2010 | Neumann et al. | |
| 2011/0153160 A1 | 6/2011 | Hesseling et al. | |
| 2014/0301097 A1 | 10/2014 | Neumann et al. | |
| 2015/0353119 A1* | 12/2015 | Ohira | B62D 1/065 |
| | | | 219/204 |
| 2018/0009462 A1 | 1/2018 | Yamamoto et al. | |
| 2018/0043920 A1 | 2/2018 | Fujii | |
| 2018/0348392 A1 | 12/2018 | Nishio et al. | |
| 2018/0354543 A1 | 12/2018 | Nishio et al. | |
| 2019/0002008 A1 | 1/2019 | Inaba et al. | |
| 2019/0106139 A1 | 4/2019 | Sasaki | |
| 2019/0193771 A1 | 6/2019 | Yamami et al. | |

FOREIGN PATENT DOCUMENTS

| | | | | |
|---|---|---|---|---|
| JP | S 62-114872 | | 7/1987 | |
| JP | 2006-151192 | | 6/2006 | |
| JP | 2010-537885 | | 12/2010 | |
| JP | 2011255877 A | | 12/2011 | |
| JP | 2017140915 A | | 8/2017 | |
| JP | 2018-002101 | | 1/2018 | |
| JP | 2018-008641 | | 1/2018 | |
| JP | 2018-024401 | | 2/2018 | |
| JP | 2018-203061 | | 12/2018 | |
| JP | 2019010944 A | | 1/2019 | |
| JP | 2019069697 A | | 5/2019 | |
| JP | 2019-085025 | | 6/2019 | |
| JP | 2019116227 A | | 7/2019 | |
| JP | 2019182263 A | * | 10/2019 | |
| JP | 2019-220134 | | 12/2019 | |
| JP | 2020-001650 | | 1/2020 | |
| KR | 20050039519 A | * | 4/2005 | B29C 45/1418 |
| WO | WO-2023008115 A1 | * | 2/2023 | |

OTHER PUBLICATIONS

PCT International Search Report (w/ English translation) for corresponding PCT Application No. PCT/JP2020/046826, mailed on Jan. 26, 2021, 7 pages.

Japanese Notice of Reasons for Refusal (w/ Machine Translation) for corresponding Application No. 2020-003974, dated Dec. 19, 2023, 11 pages.

* cited by examiner

DECORATIVE BODY

CROSS-REFERENCE TO RELATED APPLICATIONS

The present application is related and has right of priority to JP 2020-003974, which was filed on Jan. 14, 2020 in the Japanese Patent Office, and is a U.S. national phase entry of PCT/JP2020/046826, which was filed on Dec. 15, 2020, both of which are incorporated by reference in their entireties for all purposes.

TECHNICAL FIELD

The present invention relates to a decorative body provided with a functional portion.

BACKGROUND ART

In a steering wheel recited in Japanese Patent Application Laid-Open (JP-A) No. 2018-203061, an assembly member is assembled to a rim. A sensor wire is disposed at the rim and an electrically conductive member is disposed at the assembly member. The sensor wire senses a person touching the rim, and the conductive member senses a person touching the assembly member.

In this steering wheel, a connected portion of the conductive member is electrically connected with a connection portion of the sensor wire directly by a capacitive coupling or a contact.

SUMMARY OF INVENTION

Technical Problem

In consideration of the circumstances described above, an object of the present invention is to provide a decorative body in which the functional portion may sense contact of a person against a surface side of the decorative member or may illuminate the surface side of the decorative member independently from an assembly object side.

Solution to Problem

A decorative body according to a first aspect of the present invention includes: a decorative member that is assembled to an assembly object and that decorates the assembly object; and a functional portion arranged at the decorative member independently from an assembly object side, the functional portion: sensing contact of a person with a surface side of the decorative member, or illuminating the surface side of the decorative member.

In a decorative body according to a second aspect of the present invention, the decorative body according to the first aspect of the present invention further includes a protective portion provided at the decorative member, the protective portion being disposed at a back side of the functional portion and protecting the functional portion.

In a decorative body according to a third aspect of the present invention, in the decorative body according to the first or second aspect of the present invention, the functional portion heats the decorative member.

In a decorative body according to a fourth aspect of the present invention, the decorative body according to any one of the first to third aspects of the present invention further includes a projecting electrode provided at the functional portion, the projecting electrode projecting from the decorative member and being electrically connected to the assembly object side.

In a decorative body according to a fifth aspect of the present invention, in the decorative body according to any one of the first to fourth aspects of the present invention, the functional portion is electrically connected to the assembly object side due to an urging force.

Advantageous Effects of Invention

In the decorative body of the first aspect of the present invention, the decorative member is assembled to the assembly object, and the decorative member decorates the assembly object. The functional portion is arranged at the decorative member, and the functional portion senses a person touching the surface side of the decorative member or illuminates the surface side of the decorative member.

In this decorative body, the functional portion is arranged at the decorative member independently from the assembly object side. Therefore, the functional portion may sense contact of a person with the surface side of the decorative member or may illuminate the surface side of the decorative member independently from the assembly object side.

In the decorative body of the second aspect of the present invention, the protective portion of the decorative member is disposed at the back side of the functional portion, and the protective portion protects the functional portion. Therefore, the functional portion may be protected by the protective portion.

In the decorative body of the third aspect of the present invention, the functional portion heats the decorative member. Therefore, the decorative member may be heated.

In the decorative body of the fourth aspect of the present invention, the projecting electrode of the functional portion projects from the decorative member, and the projecting electrode is electrically connected to the assembly object side. Therefore, the functional portion may be electrically connected to the assembly object side easily.

In the decorative body of the fifth aspect of the present invention, the functional portion is electrically connected to the assembly object side due to the urging force. Therefore, the functional portion may be electrically connected to the assembly object side easily.

DETAILED DESCRIPTION

Figure 1:
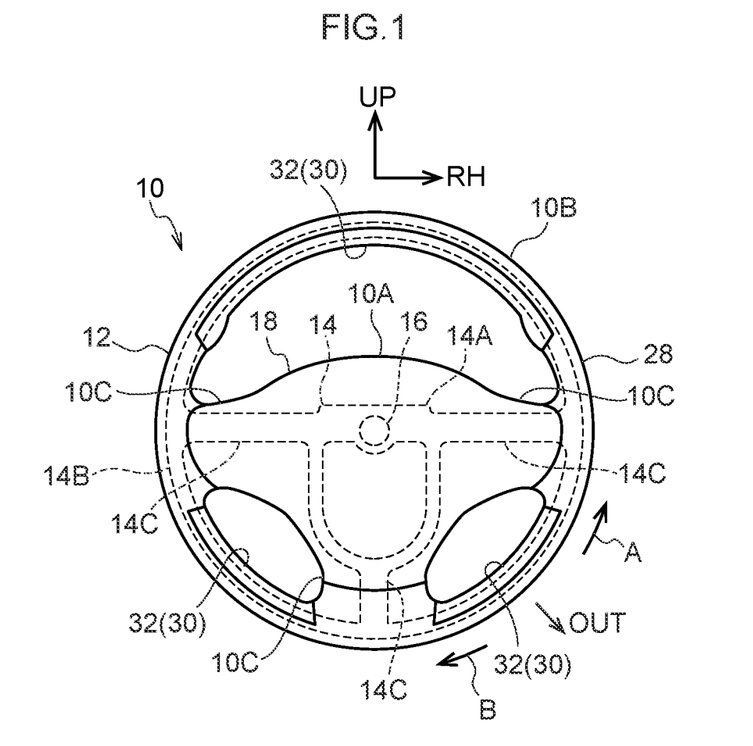
FIG. 1 is an elevation view, seen from a vehicle rear side, showing a steering wheel according to an exemplary embodiment of the present invention.

FIG. 1 is an elevation view, seen from a vehicle rear side, showing a steering wheel 10 according to an exemplary embodiment of the present invention. In the drawings, the vehicle front side is indicated by arrow FR, a vehicle right side is indicated by arrow RH, and an upper side is indicated by arrow UP. A diameter direction outer side of the steering wheel 10 is indicated by arrow OUT, one circumferential direction side (referred to below as "the one direction") of the steering wheel 10 is indicated by arrow A, and another circumferential direction side (referred to below as "the other direction") of the steering wheel 10 is indicated by arrow B.

The steering wheel 10 according to the present exemplary embodiment opposes a driver seat of the vehicle, which is at the vehicle rear side of the steering wheel 10. The steering wheel 10 is disposed at the vehicle front side of a vehicle occupant (a driver, a contact person) sitting on the driver seat.

As shown in FIG. 1, a boss portion 10A that serves as a fixed portion is provided at a central region of the steering wheel 10. A rim portion 10B with an annular shape in front view, which serves as a grip portion, is provided at an outer periphery region of the steering wheel 10. Three spoke portions 10C that serve as connection portions are provided between the boss portion 10A and the rim portion 10B. The spoke portions 10C protrude to the vehicle left side, vehicle right side and lower side from the boss portion 10A, and connect the boss portion 10A with the rim portion 10B.

A steering wheel main body 12 that serves as an assembly object is provided at the steering wheel 10. A core grid 14 fabricated of metal that serves as a framework member is provided at the steering wheel main body 12.

A boss core 14A in a plate shape is provided at a central region of the core grid 14. The boss core 14A structures the boss portion 10A. The boss core 14A is fixed to a vehicle rear side end (upper side end) of a circular rod-shaped steering shaft 16 of the vehicle, which serves as a support shaft. The steering shaft 16 is disposed to be concentric with the rim portion 10B. The steering wheel 10 (the core grid 14) is supported at the steering shaft 16 to be turnable integrally therewith. When the vehicle occupant grips the rim portion 10B and operates to turn the steering wheel 10 in the circumferential direction (in the one direction and the other direction), the steering shaft 16 turns about the central axis thereof and the vehicle is steered.

A rim core 14B with an annular shape in elevation view (see FIG. 5A) is provided at an outer periphery region of the core grid 14. The rim core 14B structures the rim portion 10B. Three spoke cores 14C in long, narrow plate shapes are provided between the boss core 14A and the rim core 14B. The spoke cores 14C protrude from the boss core 14A to the vehicle left side, vehicle right side and lower side (to outer sides in the diametric direction of the steering wheel 10).

The spoke cores 14C integrally connect the boss core 14A with the rim core 14B, and structure the spoke portions 100.

A plate-shaped pad 18 that serves as a covering member is provided at the boss portion 10A and the spoke portions 10C. The pad 18 is provided at the vehicle rear side of the boss core 14A and the spoke cores 14C, covering the vehicle rear sides of the boss core 14A and the spoke cores 14C.

Figure 4:
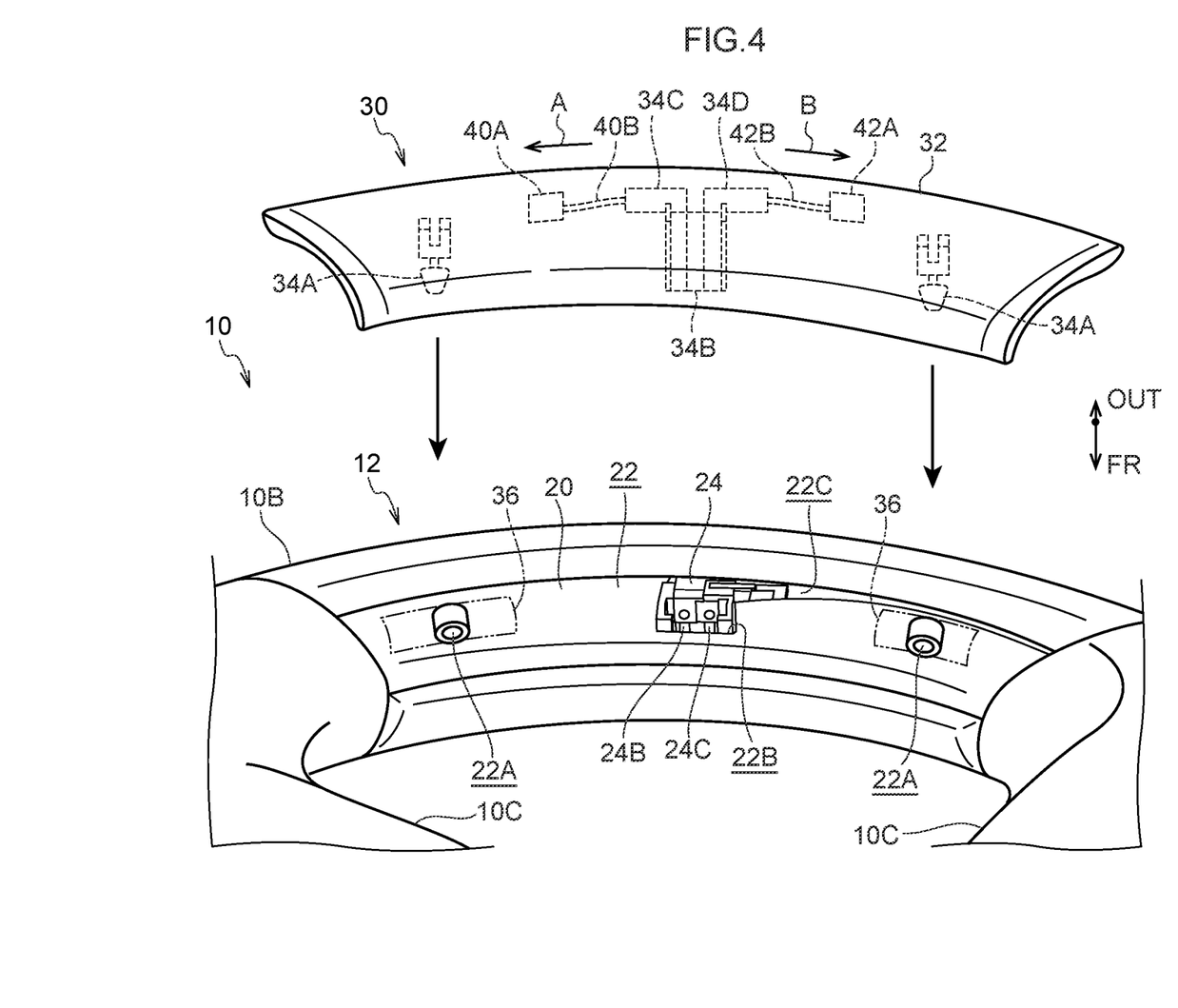
FIG. 4 is an exploded perspective view, seen from the vehicle rear side, showing the steering wheel according to the exemplary embodiment of the present invention.

An interior member 20 with an annular shape in elevation view that serves as an assembly-receiving member (see FIG. 4 and FIG. 5A) is provided at the whole of the rim portion 10B in a length direction of the rim portion 10B (the circumferential direction of the steering wheel 10) and a perimeter direction of the rim portion 10B (a direction turning around the length direction). The interior member 20 is fabricated of a soft resin (for example, polyurethane). An exterior shape of the interior member 20 in a cross section orthogonal to the length direction is a circular shape. The rim core 14B is accommodated inside the interior member 20, and the interior member 20 is fixed to the rim core 14B.

Assembly recess portions 22 that serve as assembly-receiving portions are formed in the upper side of the interior member 20, in the vehicle diagonally lower left side of the interior member 20, and in the vehicle diagonally lower right side of the interior member 20. The assembly recess portions 22 are provided at the vehicle rear side of the interior member 20 in regions at the steering wheel 10 diameter direction inner side. The assembly recess portions 22 are open to the vehicle rear side and the steering wheel 10 diameter direction inner side. Each assembly recess portion 22 extends in the length direction of the rim portion 10B. A length direction of the assembly recess portion 22 lies along the length direction of the rim portion 10B and a width direction of the assembly recess portion 22 lies along the perimeter direction of the rim portion 10B.

Cylinder-shaped assembly holes 22A are formed at both length direction end portions of a floor portion of each assembly recess portion 22. The assembly holes 22A are open to the vehicle rear side. A substantially cuboid-shaped connection hole 22B is formed at a length direction central portion of the floor portion of the assembly recess portion 22. The connection hole 22B is open to the vehicle rear side. A connection groove 22C is formed in the floor portion of the assembly recess portion 22 at the other direction side of the connection hole 22B. The connection groove 22C is open to the vehicle rear side. The connection groove 22C extends in the length direction of the assembly recess portion 22 and is in communication with the connection hole 22B and with the interior of the pad 18 (at the vehicle front side of the pad 18).

A substantially cuboid box-shaped holder 24 that serves as a connection member (see FIG. 5A and FIG. 5B) is inserted into the connection hole 22B. The interior of the holder 24 is open to the vehicle rear side. Press-fit protrusions 24A in substantially right-angled triangle shapes are integrally formed at vehicle front side end portions of a one direction side face and an other direction side face of the holder 24. The press-fit protrusions 24A protrude to the length direction outer sides of the assembly recess portion 22. Vehicle front side faces of the press-fit protrusions 24A are angled in directions to outer sides in the length direction of the assembly recess portion 22 toward the vehicle rear side. Vehicle rear side faces of the press-fit protrusions 24A are arranged orthogonally to the vehicle front-and-rear direction. The holder 24 is press-fitted into the connection hole 22B in the length direction and width direction of the assembly recess portion 22, and side faces of the connection hole 22B are resiliently deformed greatly, particularly at the press-fit protrusions 24A. Thus, the holder 24 is retained in the connection hole 22B by resilient contraction of the connection hole 22B.

A long, narrow, plate-shaped sensor spring 24B is provided inside a one direction side portion of the holder 24. The sensor spring 24B is fabricated of metal and serves as an urging portion. A vehicle rear side end portion of the sensor spring 24B is fixed to a side wall at the steering wheel 10 diameter direction outer side of the holder 24. The sensor spring 24B protrudes in a direction to the steering wheel 10 diameter direction inner side toward the vehicle front side. A long, narrow, plate-shaped shield spring 24C is provided inside an other direction side portion of the holder 24. The shield spring 24C is fabricated of metal and serves as an urging portion. A vehicle rear side end portion of the shield spring 24C is fixed to the side wall at the steering wheel 10 diameter direction outer side of the holder 24. The sensor spring 24B protrudes in the direction to the steering wheel 10 diameter direction inner side toward the vehicle front side.

A sensor harness 24D that serves as connection wiring is electrically connected to the sensor spring 24B. The sensor harness 24D is inserted into the connection groove 22C of the assembly recess portion 22 and the pad 18, and is electrically connected to a control device 26 (an ECU) of the vehicle. A shield harness 24E that serves as connection wiring is electrically connected to the shield spring 24C. The shield harness 24E is inserted into the connection groove 22C of the assembly recess portion 22 and the pad 18, and is electrically connected to the control device 26.

The whole of the interior member 20 in the length direction and perimeter direction thereof is covered by a skin 28 that serves as a surface member. The skin 28 structures a surface side face (a diameter direction outer side face) of the rim portion 10B. Three long, narrow opening holes 28A are formed penetrating through the skin 28 in correspondence with the assembly recess portions 22 of the interior member 20. The opening holes 28A open up the assembly recess portions 22 of the interior member 20 to the outside of the skin 28. Portions of the skin 28 surrounding the opening holes 28A are inserted into the assembly recess portions 22.

Decorative bodies 30 (see FIG. 2A, FIG. 3 and FIG. 4) are disposed at the steering wheel main body 12, at the assembly recess portions 22 of the interior member 20.

Figure 2A:
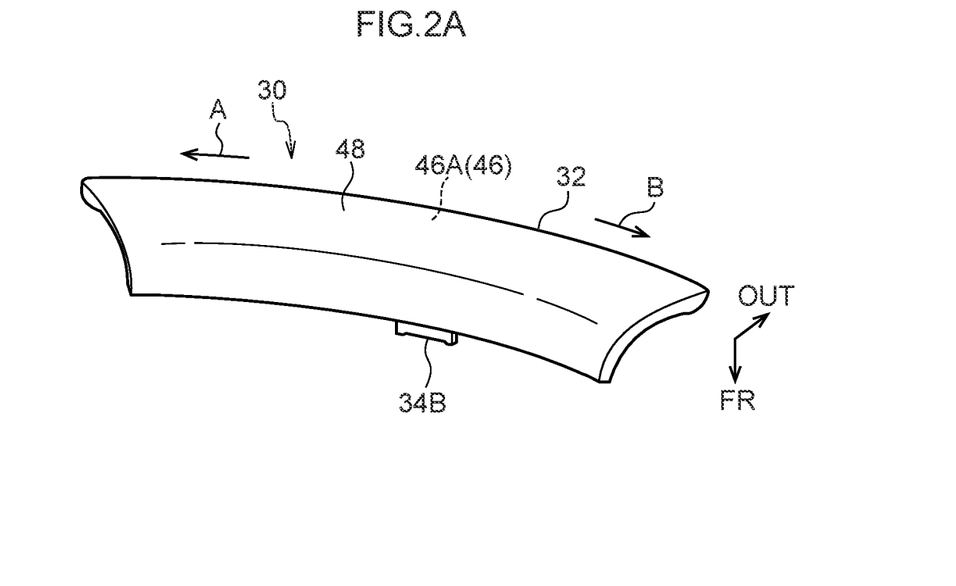
FIG. 2A is a perspective view, seen from the vehicle rear side, showing a decorative body of the steering wheel according to the exemplary embodiment of the present invention.

A long, narrow, plate-shaped decorative member 32 is provided at each decorative body 30. The decorative member 32 is assembled to the assembly recess portion 22. The decorative member 32 is curved in a length direction and width direction thereof. The decorative member 32 is disposed with the length direction thereof along the length direction of the assembly recess portion 22 and the width direction thereof along the width direction of the assembly recess portion 22.

A long, narrow, plate-shaped backing 34 (see FIG. 2B) is provided at a back side region (a rim portion 10B diameter direction inner side) of the decorative member 32. The backing 34 is fabricated of resin and serves as a protective portion. The backing 34 structures a back side face of the decorative member 32.

Rod-shaped assembly pins 34A that serve as assembly portions are integrally formed at both of length direction end portions of the back side face of the decorative member 32 (a back side face of the backing 34). Each assembly pin 34A protrudes to the vehicle front side. A distal end portion of the assembly pin 34A is formed in a coaxial truncated cone shape (which may be a full cone shape). The distal end portion of the assembly pin 34A increases in diameter toward the proximal end side of the assembly pin 34A. Thus, the distal end portion of the assembly pin 34A widens in diameter with respect to a proximal end side portion than the distal end portion of the assembly pin 34A. The assembly pin 34A is inserted into the corresponding assembly hole 22A of the assembly recess portion 22, and the distal end portion is press-fitted into the assembly hole 22A. The assembly pin 34A is retained at the assembly hole 22A by resilient contraction of the assembly hole 22A. Before the assembly pin 34A is inserted into the assembly hole 22A, an adhesive 36 is applied to the floor face of the assembly recess portion 22 at the one direction side and the other direction side of the assembly hole 22A. When the assembly pin 34A is inserted into the assembly hole 22A, the back side face of the decorative member 32 and the floor face of the assembly recess portion 22 are adhered together by the adhesive 36. Thus, the decorative member 32 is assembled to the assembly recess portion 22, and portions of the skin 28 around each opening hole 28A are nipped between respective length direction side faces and width direction side faces of the decorative member 32 and corresponding length direction side faces and width direction side faces of the assembly recess portion 22.

Figure 3:
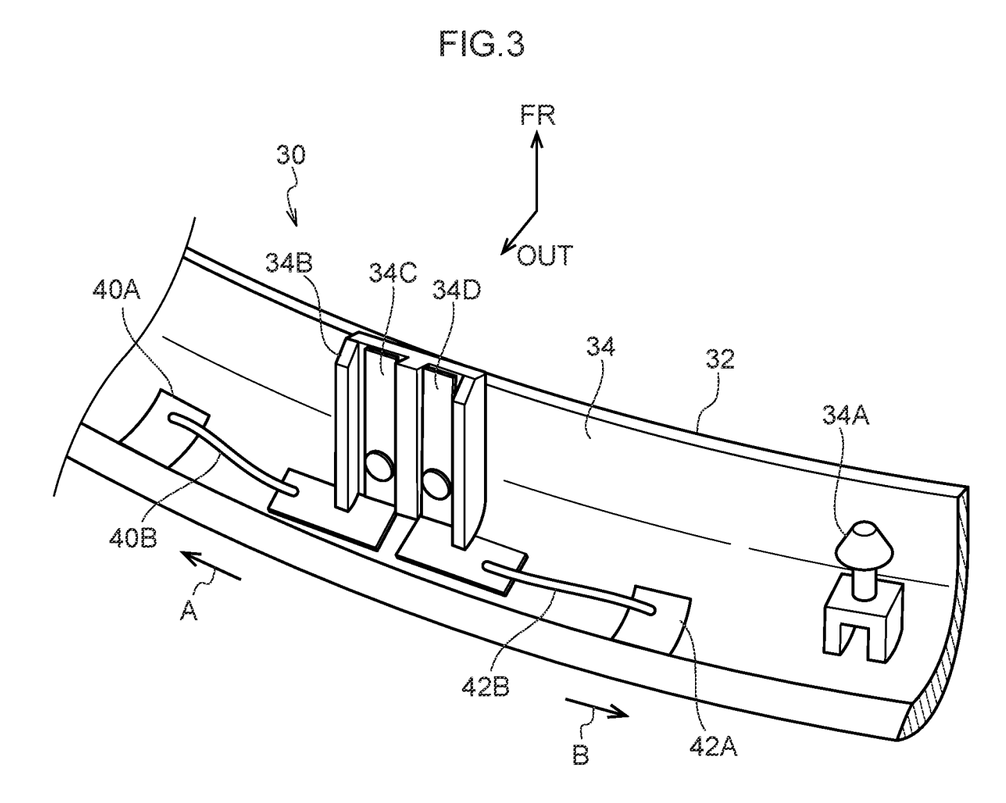
FIG. 3 is a perspective view, seen from the vehicle front side, showing the decorative body of the steering wheel according to the exemplary embodiment of the present invention.

A connection rib 34B is firmed integrally at a length direction central portion of the back side face of the decorative member 32 (the back side face of the backing 34). The connection rib 34B has an "E"-shaped frame shape in cross section. The connection rib 34B protrudes to the vehicle front side, and interior portions of the connection rib 34B are open to the width direction outer side of the decorative member 32 (the steering wheel 10 diameter direction outer side). A curved plate-shaped sensor terminal 34C is disposed in a one direction side portion of the connection rib 34B. The sensor terminal 34C is fabricated of metal and serves as a terminal. A distal end side portion of the sensor terminal 34C protrudes to the vehicle front side within the one direction side portion of the connection rib 34B. The distal end side portion of the sensor terminal 34C is fixed to a floor wall (a wall at the steering wheel 10 diameter direction inner side) of the one direction side portion of the connection rib 34B. A proximal end side portion of the sensor terminal 34C is formed in a "U"-shaped plate shape. The proximal end side portion of the sensor terminal 34C protrudes to the one direction side of the connection rib 34B. A curved plate-shaped shield terminal 34D is disposed in an other direction side portion of the connection rib 34B. The shield terminal 34D is fabricated of metal and serves as a terminal. A distal end side portion of the shield terminal 34D protrudes to the vehicle front side within the other direction side portion of the connection rib 34B. The distal end side portion of the shield terminal 34D is fixed to a floor wall of the other direction side portion of the connection rib 34B. A proximal end side portion of the shield terminal 34D is formed in a "U"-shaped plate shape. The proximal end side portion of the sensor terminal 34C protrudes to the other direction side of the connection rib 34B.

Figure 5A:
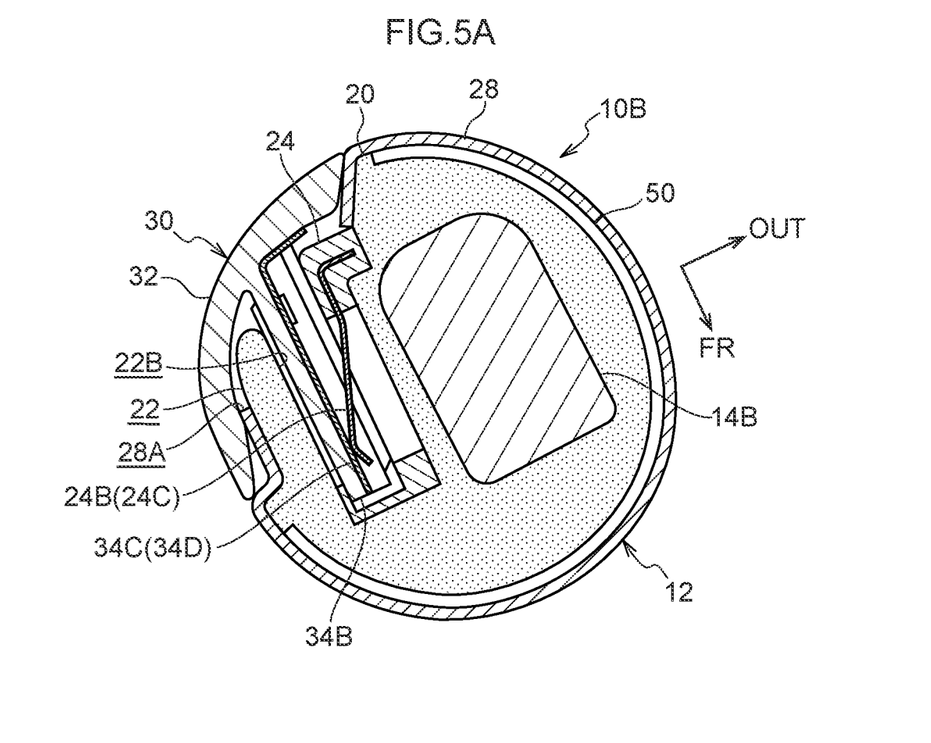
FIG. 5A is a sectional diagram showing a rim portion of the steering wheel according to the exemplary embodiment of the present invention.
Figure 5B:
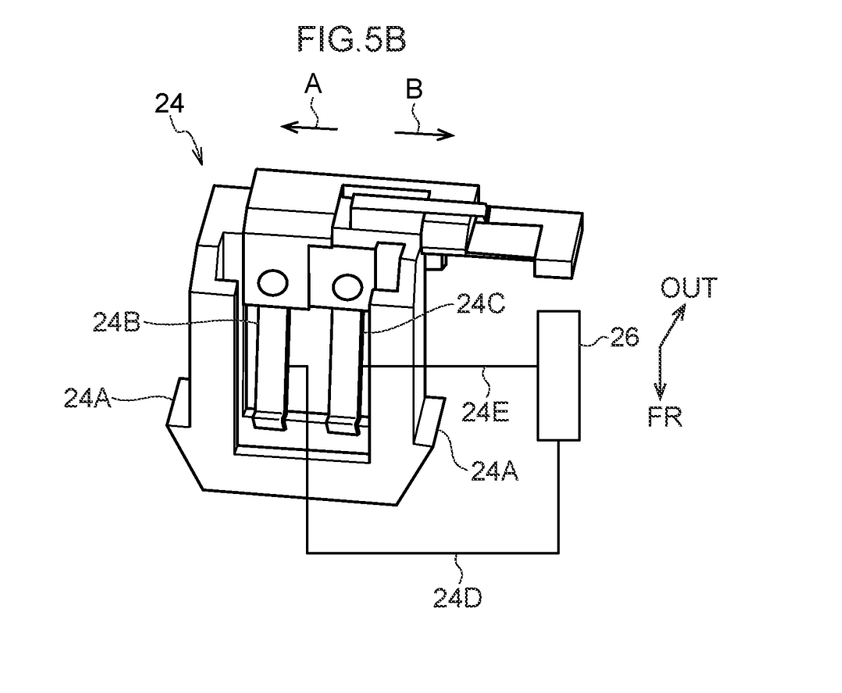
FIG. 5B is a perspective view, seen from the vehicle rear side, showing a holder of the steering wheel according to the exemplary embodiment of the present invention.

The connection rib 34B fits inside the holder 24 of the interior member 20 (see FIG. 5A). The sensor spring 24B of the holder 24 makes contact with the distal end side portion of the sensor terminal 34C due to the urging force thereof, and the sensor spring 24B is electrically connected with the sensor terminal 34C. The shield spring 24C of the holder 24 makes contact with the distal end side portion of the shield terminal 34D due to the urging force thereof, and the shield spring 24C is electrically connected with the shield terminal 34D.

A long, narrow, plate-shaped sensor 38 (see FIG. 2B) is provided in each decorative member 32, at the surface side (the rim portion 10B diameter direction outer side) of the backing 34. The sensor 38 serves as a functional portion (a sensing portion).

Figure 2B:
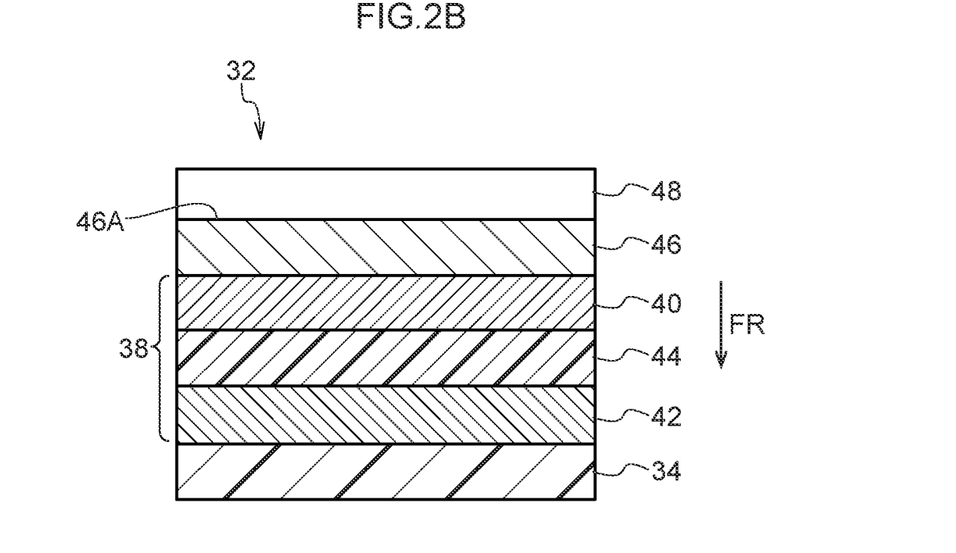
FIG. 2B is a sectional diagram showing the decorative body of the steering wheel according to the exemplary embodiment of the present invention.

A long, narrow, sheet-shaped sensor electrode 40 that serves as a sensor portion is provided in a surface side portion of the sensor 38. The sensor electrode 40 is formed by an aluminium foil or conductive film fabricated of metal, or the like. A rectangle-shaped sensor projecting portion 40A that serves as a projecting electrode is integrally formed at a length direction middle portion of the sensor electrode 40. The sensor projecting portion 40A projects from the sensor electrode 40 to the width direction outer side (the steering wheel 10 diameter direction outer side) of the decorative member 32. The sensor projecting portion 40A is folded back to the back side of the decorative member 32 (the back side of the backing 34). The sensor projecting portion 40A is spaced apart to the one direction side from the sensor terminal 34C, and is spaced apart to the other direction side from the adhesive 36 at the one direction side. The sensor projecting portion 40A is electrically connected to the proximal end side portion of the sensor terminal 34C by a sensor relay harness 40B that serves as relay wiring. As an example, if the projecting portion 40A is the aluminium foil, the sensor relay harness 40B is connected to the sensor projecting portion 40A by a technique known as ultrasonic welding.

A long, narrow, sheet-shaped shield electrode 42 that serves as a shield portion is provided in a back side portion of the sensor 38. The shield electrode 42 is formed by an aluminium foil or conductive film fabricated of metal, or the like, and is fixed to the surface side of the backing 34. A rectangle-shaped shield projecting portion 42A that serves as a projecting electrode is integrally formed at a length direction middle portion of the shield electrode 42. The shield projecting portion 42A projects from the shield electrode 42 to the width direction outer side of the decorative member 32. The shield projecting portion 42A is folded back to the back side of the decorative member 32. The shield projecting portion 42A is spaced apart to the other direction side from the shield terminal 34D, and is spaced apart to the one direction side from the adhesive 36 at the other direction side. The shield projecting portion 42A is electrically connected to the proximal end side portion of the shield terminal 34D by a shield relay harness 42B that serves as relay wiring. As an example, if the shield projecting portion 42A is the aluminium foil, the shield relay harness 42B is connected to the shield projecting portion 42A by the technique known as ultrasonic welding.

A long, narrow plate-shaped insulation layer 44 that serves as an insulating portion is provided between the sensor electrode 40 and the shield electrode 42. The sensor electrode 40 and the shield electrode 42 are fixed to the insulation layer 44. The insulation layer 44 is fabricated of resin, and the insulation layer 44 electrically insulates the sensor electrode 40 from the shield electrode 42.

A long, narrow, plate-shaped veneer 46 (see FIG. 2B) that serves as a decorative portion is provided at the surface side of the sensor 38 (the surface side of the sensor electrode 40). The veneer 46 is fixed to the sensor electrode 40. A surface side face of the veneer 46 is a decorative surface 46A. As an example, a wood grain pattern is provided at the decorative surface 46A.

A coating 48 (see FIG. 2B) that serves as a covering portion is provided by coating the surface side of the veneer 46 and respective length direction sides and respective width direction sides of the backing 34, the sensor 38 and the veneer 46 (including a portion of the sensor projecting portion 40A and a portion of the shield projecting portion 42A). Thus, the coating 48 covers the surface side face of the veneer 46 and respective length direction side faces and respective width direction side faces of the backing 34, the sensor 38 and the veneer 46 (including the portion of the sensor projecting portion 40A and the portion of the shield projecting portion 42A). The coating 48 structures a surface side face of the decorative member 32, is transparent and is capable of transmitting light. Thus, the decorative surface 46A of the veneer 46 may be seen through the coating 48 from the surface side of the coating 48. Accordingly, the steering wheel main body 12 is decorated by the decorative surfaces 46A of the veneers 46.

A flexible plate-shaped main body sensor 50 that serves as an object sensor is adhered to the outer periphery of the interior member 20 in regions excluding the assembly recess portions 22. The surface side of the main body sensor 50 is covered by the skin 28. Similarly to the sensor 38, the insulation layer 44 is provided at the main body sensor 50, between the sensor electrode 40 at the surface side and the shield electrode 42 at the back side. This sensor electrode 40 and shield electrode 42 are electrically connected to the control device 26.

Now, operation of the present exemplary embodiment is described.

In the steering wheel 10 with the structure described above, the decorative member 32 of each decorative body 30 is assembled to the corresponding assembly recess portion 22 of the steering wheel main body 12 (the interior member 20). The decorative surfaces 46A of the veneers 46 of the decorative members 32 decorate the steering wheel main body 12.

At the sensor 38 of each decorative member 32, the sensor electrode 40 is electrically connected to the control device 26 via the sensor projecting portion 40A, the sensor relay harness 40B, the sensor terminal 34C, and the sensor spring 24B and sensor harness 24D of the holder 24. In addition, the shield electrode 42 is electrically connected to the control device 26 via the shield projecting portion 42A, the shield relay harness 42B, the shield terminal 34D, and the shield spring 24C and shield harness 24E of the holder 24.

At the main body sensor 50 of the steering wheel main body 12, the sensor electrode 40 and the shield electrode 42 thereof are electrically connected to the control device 26.

When a vehicle occupant grips the rim portion 10B of the steering wheel 10 and a hand of the vehicle occupant touches the surface side face of the decorative member 32, a capacitance produced between the hand of the vehicle occupant and the sensor electrode 40 of the sensor 38 is detected at the control device 26. Thus, the gripping of the rim portion 10B by the vehicle occupant (the hand touching against the decorative member 32) is detected. Control is performed by the control device 26 to equalize the potentials of the sensor electrode 40 and the shield electrode 42. Therefore, production of a parasitic capacitance between the sensor electrode 40 and the rim core 14B is suppressed by the shield electrode 42, and a change caused by this parasitic capacitance in the capacitance produced between the hand of the vehicle occupant and the sensor electrode 40 is suppressed. Thus, a reduction in detection accuracy of gripping of the rim portion 10B by the vehicle occupant is suppressed.

When a vehicle occupant grips the rim portion 10B of the steering wheel 10 and a hand of the vehicle occupant touches the surface side face of the skin 28 of the steering wheel main body 12, a capacitance produced between the hand of the vehicle occupant and the sensor electrode 40 of the main body sensor 50 is detected at the control device 26. Thus, the gripping of the rim portion 10B by the vehicle occupant (the hand touching against the skin 28) is detected. Control is performed by the control device 26 to equalize the potentials of the sensor electrode 40 and shield electrode 42 at the main body sensor 50. Therefore, production of a parasitic capacitance between the sensor electrode 40 and the rim core 14B is suppressed by the shield electrode 42, and a change caused by this parasitic capacitance in the capacitance produced between the hand of the vehicle occupant and the sensor electrode 40 is suppressed. Thus, a reduction in detection accuracy of gripping of the rim portion 10B by the vehicle occupant is suppressed.

In this structure, the sensor 38 of the decorative member 32 is not directly connected electrically to the main body sensor 50 of the steering wheel main body 12 but the sensor 38 is arranged at the decorative member 32 independently from the main body sensor 50. Therefore, the sensor 38 may sense gripping of the rim portion 10B by a vehicle occupant independently from the main body sensor 50. Thus, any influence of the main body sensor 50 on sensing by the sensor 38 of a vehicle occupant gripping the rim portion 10B may be suppressed, and the sensor 38 may sense a vehicle occupant gripping the rim portion 10B accurately.

In the decorative member 32, the backing 34 is provided at the back side of the sensor 38, and the backing 34 covers the back side of the sensor 38. Therefore, the sensor 38 may be protected by the backing 34. In addition, in contrast to a structure in which the sensor 38 is provided at the back side of the backing 34, the backing 34 is adhered by the adhesive 36 to the floor face of the assembly recess portion 22 of the interior member 20. Therefore, contact of the adhesive 36 with the sensor 38 may be suppressed, and damage to the sensor 38 due to the adhesive 36 may be suppressed. Moreover, there is no need to provide the sensor 38 to be spaced apart from the adhesive 36 at the back side of the backing 34, and an area of the decorative member 32 at which the sensor 38 is provided may be increased. Further, in contrast to a structure in which the sensor 38 is provided at the back side of the backing 34, a distance between the surface side face of the decorative member 32 and the sensor 38 (the sensor electrode 40) may be reduced, a capacitance produced between the hand of a vehicle occupant and the sensor 38 (the sensor electrode 40) may be increased, and detection accuracy of the vehicle occupant gripping the rim portion 10B may be improved.

The sensor projecting portion 40A of the sensor electrode 40 and the shield projecting portion 42A of the shield electrode 42 project from the decorative member 32, and the sensor electrode 40 and shield electrode 42 are electrically connected with the control device 26 via, respectively, the sensor projecting portion 40A and the shield projecting portion 42A. Therefore, even though the backing 34 is provided at the back side of the sensor 38, the sensor electrode 40 and shield electrode 42 may easily be electrically connected with the control device 26. In addition, although disposed at the back side of the backing 34, the sensor projecting portion 40A and the shield projecting portion 42A are spaced apart from the adhesive 36. Therefore, damage to the sensor projecting portion 40A and shield projecting portion 42A due to the adhesive 36 may be suppressed.

When each decorative member 32 is being assembled to the assembly recess portion 22 of the interior member 20, the sensor spring 24B and shield spring 24C of the holder 24 of the interior member 20 are electrically connected to the sensor terminal 34C and shield terminal 34D of the decorative member 32 due to the respective urging forces. Thus, the sensor electrode 40 and shield electrode 42 are electrically connected to the control device 26. Therefore, the sensor electrode 40 and shield electrode 42 may be electrically connected to the control device 26 easily.

The holder 24, the sensor harness 24D and the shield harness 24E are respectively inserted into the connection hole 22B and connection groove 22C in the interior member 20. Therefore, there is no need to dispose the holder 24, sensor harness 24D and shield harness 24E between the floor face of the assembly recess portion 22 of the interior member 20 and the decorative member 32, a gap between the floor face of the assembly recess portion 22 and the decorative member 32 may be made smaller, and an area of adhesion by the adhesive 36 between the floor face of the assembly recess portion 22 and the decorative member 32 may be increased. In addition, an area in which the holder 24, sensor harness 24D and shield harness 24E are disposed between the floor face of the assembly recess portion 22 and the decorative member 32 may be made smaller, an area of the holder 24, sensor harness 24D and shield harness 24E covered by the decorative member 32 may be made smaller, and the decorative member 32 may be made smaller.

In the present exemplary embodiment, the main body sensor 50 is provided at the steering wheel main body 12. However, the main body sensor 50 need not be provided at the steering wheel main body 12.

Figure 7:
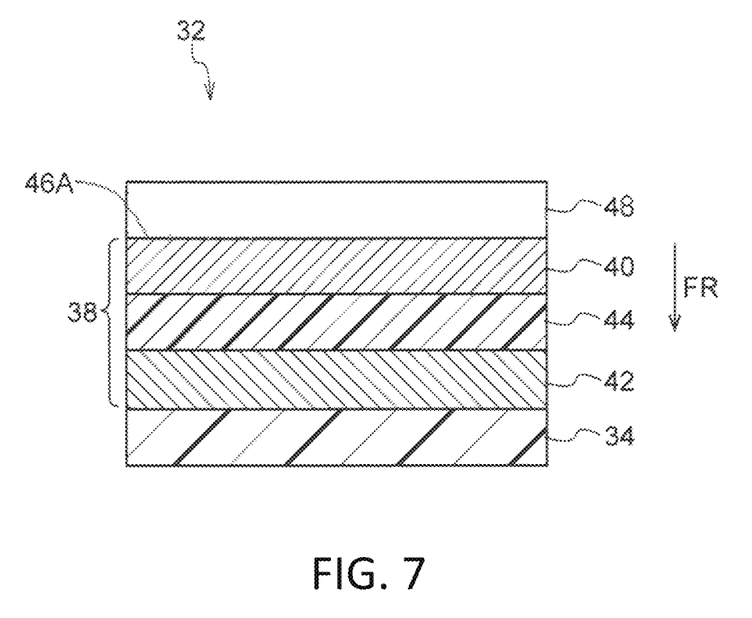
FIG. 7 is a sectional diagram showing a variant example of the decorative body of the steering wheel according to the exemplary embodiment of the present invention.

In the present exemplary embodiment, the veneer 46 is provided at each decorative member 32. However, at least a portion of the veneer 46 need not be provided at the decorative member 32, and a surface side face of the sensor electrode 40 may structure the decorative surface 46A as shown in FIG. 7.

Figure 6:
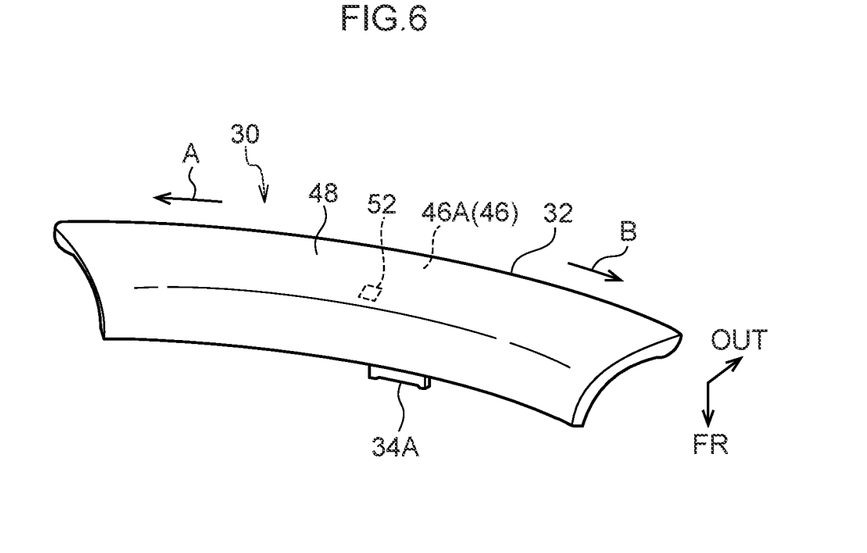
FIG. 6 is a perspective view, seen from the vehicle rear side, showing a variant example of the decorative body of the steering wheel according to the exemplary embodiment of the present invention.

In the present exemplary embodiment, the sensor 38 is provided at the decorative member 32. However, an illumination portion serving as the functional portion may be provided at the decorative member 32 in addition to the sensor 38 or instead of the sensor 38. For example, as in the variant example shown in FIG. 6, an LED 52 that serves as the illumination portion may be provided at the decorative member 32, at the back side of the coating 48. The LED 52 may emit light when electrified, and may illuminate the surface side of the decorative member 32 through the coating 48.

In the present exemplary embodiment, the shield electrode 42 of the decorative member 32 may be formed as a heating portion that serves as the functional portion, and the shield electrode 42 may generate heat when electrified and heat the decorative member 32. Further, a heating portion may be provided at the decorative member 32 in addition to the sensor 38 or instead of the sensor 38, and the heating portion may generate heat when electrified and heat the decorative member 32.

In the present exemplary embodiment, the decorative member 32 is assembled to the steering wheel main body 12. However, the decorative member 32 may be assembled to a body other than the steering wheel main body 12.

The disclosures of Japanese Patent Application No. 2020-003974 filed Jan. 14, 2020 are incorporated into the present specification by reference in their entirety.

EXPLANATION OF THE REFERENCE SYMBOLS 12, steering wheel main body (assembly object); 30, decorative body; 32, decorative member; 34, backing (protective portion); 38, sensor (functional portion); 40A, projecting portion (projecting electrode); 42A, shield projecting portion (projecting electrode); 52, LED (functional portion).

The invention claimed is:

1. A decorative body comprising:
   a decorative member that is assembled to an assembly object which is an outer peripheral region of a steering wheel and that is provided with a decorative surface which decorates the assembly object;
   a functional portion arranged at the decorative member independently from an assembly object side, a surface side face of the functional portion being the decorative surface, the functional portion being disposed with respect to an entire surface side face of the decorative member to sense contact of a person with a surface side of the decorative member; and
   a projecting electrode provided at the functional portion, the projecting electrode projecting from the decorative member and being electrically connected to the assembly object side.

2. The decorative body according to claim 1, further comprising a protective portion provided at the decorative member, the protective portion being disposed at a back side of the functional portion and protecting the functional portion.

3. The decorative body according to claim 1, wherein the functional portion heats the decorative member.

4. The decorative body according to claim 1, wherein the projecting electrode projects at a back side of the decorative member.

5. The decorative body according to claim 1, wherein a surface side face of the functional portion decorates the assembly object.

6. A decorative body comprising:
   a decorative member that is assembled to an assembly object which is an outer peripheral region of a steering wheel and that is provided with a decorative surface which decorates the assembly object; and
   a functional portion arranged at the decorative member independently from an assembly object side, a surface side face of the functional portion being the decorative surface, the functional portion being disposed with respect to an entire surface side face of the decorative member to sense contact of a person with a surface side of the decorative member, wherein the functional portion is electrically connected to the assembly object side due to an urging force.

7. A decorative body comprising:
   a decorative member that is assembled to an assembly object which is an outer peripheral region of a steering wheel and that is provided with a decorative surface which decorates the assembly object; and
   a functional portion arranged at the decorative member independently from an assembly object side, a surface side face of the functional portion being the decorative surface, the functional portion being disposed with respect to an entire surface side face of the decorative member to sense contact of a person with a surface side of the decorative member, wherein the decorative member is assembled to the assembly object at portions excluding the functional portion.

8. A decorative body comprising:
   a decorative member that is assembled to an assembly object which is an outer peripheral region of a steering wheel and that is provided with a decorative surface which decorates the assembly object; and
   a functional portion arranged at the decorative member independently from an assembly object side, a surface side face of the functional portion being the decorative surface, the functional portion being disposed with respect to an entire surface side face of the decorative member to sense contact of a person with a surface side of the decorative member, wherein the decorative member is assembled to the assembly object at portions excluding an electrical connection portion of the functional portion that connects to the assembly object side.

9. A decorative body comprising:
   a decorative member that is assembled to an assembly object which is an outer peripheral region of a steering wheel and that is provided with a decorative surface which decorates the assembly object; and
   a functional portion arranged at the decorative member independently from an assembly object side, a surface side face of the functional portion being the decorative surface, the functional portion being disposed with respect to an entire surface side face of the decorative member to sense contact of a person with a surface side of the decorative member, wherein an electrical connection portion of the functional portion that connects to the assembly object side is inserted into the assembly object.

* * * * *